(12) United States Patent
Long et al.

(10) Patent No.: US 8,316,429 B2
(45) Date of Patent: Nov. 20, 2012

(54) METHODS AND SYSTEMS FOR OBTAINING URL FILTERING INFORMATION

(75) Inventors: Darrell Long, Katy, TX (US); Lee Dolsen, Albuquerque, NM (US); Doug Moen, Waterloo (CA)

(73) Assignee: Blue Coat Systems, Inc., Sunnyvale, CA (US)

(*) Notice: Subject to any disclaimer, the term of this patent is extended or adjusted under 35 U.S.C. 154(b) by 1073 days.

(21) Appl. No.: 11/344,787

(22) Filed: Jan. 31, 2006

(65) Prior Publication Data

US 2007/0180510 A1    Aug. 2, 2007

(51) Int. Cl.
 *H04L 9/32* (2006.01)
(52) U.S. Cl. .............. 726/12; 726/10; 726/11; 713/154; 713/156; 713/159; 713/160
(58) Field of Classification Search .......... 713/153–160; 726/10–12
 See application file for complete search history.

(56) References Cited

U.S. PATENT DOCUMENTS

| | | | | |
|---|---|---|---|---|
| 5,941,947 | A * | 8/1999 | Brown et al. | 709/225 |
| 5,983,350 | A * | 11/1999 | Minear et al. | 726/11 |
| 6,907,401 | B1 * | 6/2005 | Vittal et al. | 705/26.2 |
| 7,003,118 | B1 * | 2/2006 | Yang et al. | 380/287 |
| 7,032,110 | B1 * | 4/2006 | Su et al. | 713/156 |
| 7,099,957 | B2 * | 8/2006 | Cheline et al. | 709/245 |
| 7,430,757 | B1 * | 9/2008 | Chari et al. | 726/4 |
| 7,543,146 | B1 * | 6/2009 | Karandikar et al. | 713/175 |
| 7,634,811 | B1 * | 12/2009 | Kienzle et al. | 726/22 |
| 7,757,088 | B2 * | 7/2010 | Abdulhayoglu | 713/175 |
| 7,904,951 | B1 * | 3/2011 | Ebrahimi et al. | 726/12 |
| 2001/0037253 | A1 * | 11/2001 | Kensey | 705/26 |
| 2002/0194601 | A1 * | 12/2002 | Perkes et al. | 725/44 |
| 2003/0014659 | A1 * | 1/2003 | Zhu | 713/200 |
| 2004/0015725 | A1 * | 1/2004 | Boneh et al. | 713/201 |
| 2004/0064334 | A1 * | 4/2004 | Nye | 705/1 |
| 2004/0068665 | A1 * | 4/2004 | Fox et al. | 713/201 |
| 2004/0088542 | A1 * | 5/2004 | Daude et al. | 713/156 |
| 2005/0015594 | A1 * | 1/2005 | Ashley et al. | 713/168 |
| 2005/0144297 | A1 * | 6/2005 | Dahlstrom et al. | 709/229 |
| 2005/0216421 | A1 * | 9/2005 | Barry et al. | 705/64 |
| 2006/0031559 | A1 * | 2/2006 | Sorokopud et al. | 709/232 |
| 2006/0236096 | A1 * | 10/2006 | Pelton et al. | 713/155 |
| 2007/0234414 | A1 * | 10/2007 | Liu | 726/11 |

OTHER PUBLICATIONS

Marco Antônio Carnut; Evandro Curvelo Hora, "A Proxy-Based Approach to Take Cryptography Out of the Browsers for Better Security and Usability", 4th Annual PKI R&D Workshop, 2005.*

* cited by examiner

*Primary Examiner* — Taghi Arani
*Assistant Examiner* — Amir Mehrmanesh
(74) *Attorney, Agent, or Firm* — Tarek N. Fahmi, APC

(57) ABSTRACT

A host computer system is categorized according to uniform resource locator (URL) information extracted from a digital certificate purportedly associated with said host. Thereafter, a secure communication session (e.g., an SSL session) with said host may be granted or denied according to results of the categorizing. If granted, messages associated with the secure session may be tunneled through a proxy without decryption, or, in some cases, even though the secure communication session was authorized messages may be decrypted at the proxy.

17 Claims, 3 Drawing Sheets

| Uniform Resource Locator (URL) | Category |
|---|---|

```
X.509-Certificate ::= SEQUENCE {
   certificateInfo CertificateInfo,
   signatureAlgorithm AlgorithmIdentifier,
   signature BIT STRING
}

CertificateInfo ::= SEQUENCE {
   version [0] Version DEFAULT v1988,
   serialNumber CertificateSerialNumber,
   signature AlgorithmIdentifier,
   issuer Name,
   validity Validity,
   subject Name,
   subjectPublicKeyInfo SubjectPublicKeyInfo
}

Version ::= INTEGER { v1988(0) }

CertificateSerialNumber ::= INTEGER

Validity ::= SEQUENCE {
   notBefore UTCTime,
   notAfter UTCTime
}

SubjectPublicKeyInfo ::= SEQUENCE {
   algorithm AlgorithmIdentifier,
   subjectPublicKey BIT STRING
}

AlgorithmIdentifier ::= SEQUENCE {
   algorithm OBJECT IDENTIFIER,
   parameters ANY DEFINED BY ALGORITHM OPTIONAL
}
```

Figure 2

METHODS AND SYSTEMS FOR OBTAINING URL FILTERING INFORMATION

FIELD OF THE INVENTION

The present invention relates to methods for extracting and categorizing uniform resource locators (URLs) identifying hosts involved in secure Internet communications without having to decrypt secure socket layer (SSL) communications from clients seeking access to such hosts.

BACKGROUND

Firewalls have become a ubiquitous part of computer networks. Generally, firewalls can be viewed as combined hardware/software systems that reside at gateways between different networks, usually a private network (such as an enterprise's local area network or LAN) and the Internet. The firewall implements policies that determine which traffic can pass between the two networks, blocking access from one to the other when one or more of these policies are implicated. In many applications this policing is implemented at a proxy server.

At the minimum, a proxy server must relay requests in and out of the firewall to offer Internet access to computers inside the private network. This allows private network users to visit Internet Web sites. For most Web sites the information exchanged between the Internet host(s) and the private network client is passed unencrypted. Hence, the proxy is able to examine the information being passed and evaluate it against its firewall rules to determine whether or not the communications should be allowed.

Some communications, however, do not take place "in the clear". Instead, communications between the private network client and the Internet host(s) are encrypted so as to prevent eavesdropping by third parties. Such encrypted communications are common in cases of Internet hosts involved with electronic commerce or banking, for example.

While the encryption of communications in these situations provides many benefits, one unfortunate consequence may be that proxy servers are not able to read the messages being passed. Hence, these proxies have no way of determining whether their firewall policies are being violated. This means that the private network clients may become vulnerable to attacks by computer viruses and other malware. It may also expose private network owners/operators to possible liability if traffic that otherwise would not have been permitted to pass through the firewall is allowed to pass.

One solution of course would be to permit the proxy to decrypt all transmissions between the private network client and the host and subject those decrypted communications to scrutiny according to the firewall policies just as if the original communications had not been encrypted. This is rather undesirable, however, inasmuch as it defeats the entire purpose of providing a secure communication mechanism for sensitive data. Once decrypted, the sensitive information may become an attractive target for attacks by third parties seeking to exploit such information to their advantage. In addition, even if other security measures were put in place to minimize the possibilities of success of such attacks, some users may simply object to the intrusion into their privacy. Imagine, for example, if users were told that their on-line banking transactions were going to be decrypted and subjected to such scrutiny against firewall policies. Many users would simply forgo such communications altogether rather than permit this exposure of their personal data, thereby becoming effectively deprived of what may be a very efficient way to conduct business.

Thus, what is needed is an effective way to police secure or encrypted communications between clients and hosts that does not require decryption of the message traffic.

SUMMARY OF THE INVENTION

In various embodiments, the present invention provides a proxy configured to enforce a set of rules on network traffic by intercepting the network traffic that flows between a client and a server, parsing and analyzing the messages being sent in either or both directions, and modifying the traffic based on a collection of rules (i.e., policies which require that if a specified condition is true, then a corresponding action is taken). Conditions of interest include any hostname or URL extracted from a client request or server response other than the HTTP request URL. For example, a server certificate host category; other information in the server certificate; and a "referer" category, to name just a few. Examples of actions include authenticating a client; logging a request; limiting bandwidth of a communication between a client and server; allowing a request without modification; blocking a request; and allowing a secure connection to proceed, either by tunneling the packets, or by decrypting the SSL session. Of course, many other different actions may be supported in addition to or in place of one or more of the above-described actions.

In one embodiment of the present invention, a host computer system is categorized according to uniform resource locator (URL) information extracted from a digital certificate purportedly associated with said host. Thereafter, a secure communication session (e.g., an SSL session) with said host may be granted or denied according to results of the categorizing. If granted, messages associated with the secure session may be tunneled through a proxy without decryption, or, in some cases, even though the secure communication session was authorized messages may be decrypted at the proxy.

A further embodiment of the invention involves extracting, at a proxy, information from a digital certificate proffered by an Internet host, and categorizing that Internet host according to the information. Such categorizing may include using the information from the certificate to index or otherwise access a data structure and retrieve corresponding category information for the Internet host. Thereafter, the process may involve granting or denying access to the Internet host from a client communicatively coupled to the proxy according to access policies implemented according to results of the categorizing. Such access may include access via a secure communication session (e.g., an SSL session) during which messages may be decrypted at the proxy or not so decrypted.

Prior to extracting the information from the certificate, which information may be a host name, information identifying the issuer of the certificate, or other information, a request for the certificate may be transmitted to the Internet host from the proxy. Such activities may be carried out in response to receiving a client hello message from a client communicatively coupled to the proxy, the hello message indicating the client's attempt to access the Internet host.

Yet a further embodiment of the present invention involves categorizing a referring source for a request for an object made by a client and authorizing or not authorizing such a request according to results of the categorization. The referring source and the destination to which request for the object is made may be different host systems. Such categorization may therefore involve extracting from the client's request identifying information for the referring host, and using that identifying information to retrieve category information describing the referring host so as to determine whether or not to permit the request.

BRIEF DESCRIPTION OF THE DRAWINGS

The present invention is illustrated by way of example, and not limitation, in the figures of the accompanying drawings, in which:

FIG. 2 illustrates an example of a conventional digital certificate.

DESCRIPTION

Figures 1, 4:
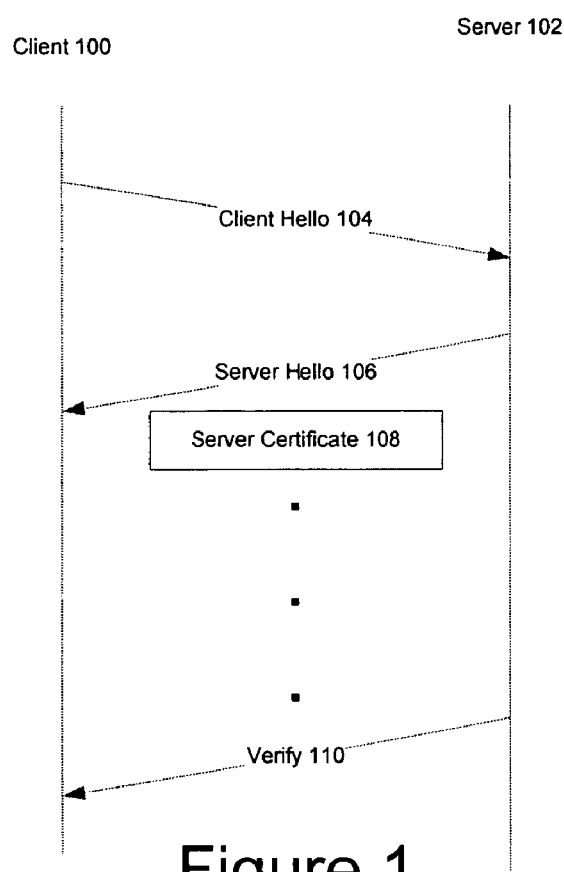
FIG. 1 illustrates a portion of a conventional SSL handshake between a client and a server.
FIG. 4 illustrates an example of a URL database for use in accordance with embodiments of the present invention.

Described herein are methods for extracting and categorizing uniform resource locators (URLs) identifying hosts involved in secure Internet communications without having to decrypt secure socket layer (SSL) communications from clients seeking access to such hosts. In a related field, methods for extracting URLs from so-called "refer headers" in order to better categorize requested content or other information are also presented. It should be remembered, however, that in the following discussion the illustrated embodiments of the present invention are presented merely as examples of the present invention in order to help the reader better understand the nature thereof. The scope of the invention should only be measured by the claims following this description.

As used herein in the context of the present invention, the term proxy is meant to refer to a device that enforces a set of rules on network traffic by intercepting the network traffic that flows between a client and a server, parsing and analyzing the messages being sent in both directions, and modifying the traffic based on a collection of "if-then" rules. A "rule" may be regarded as a policy or other statement such that if a specified condition is true, then a corresponding action is taken. An example of such a "condition" may be, "does the request URL belong to [a designated] category?". A corresponding action if the condition is found to be true may be to "deny this request".

As discussed further below, conditions of interest include a server certificate host category; other information in the server certificate; and a "referer" category. It should be appreciated, however, that these conditions may be generalized to encompass such matters as any hostname or URL extracted from a client request or server response other than the HTTP request URL (which is generally used by others in the industry for "content filtering"). Stated differently, the present invention provides methods and systems for categorizing a URL other than the HTTP request URL.

In addition, examples of "actions" described below include allowing a request without modification; blocking a request; and allowing a secure connection to proceed, either by tunneling the packets, or by decrypting the SSL session. But it should be appreciated that there are many more kinds of actions that a network proxy configured in accordance with the present invention could take, conditional on one or more of the conditions described above. These include, but are not limited to: deciding to block a request; deciding to authenticate a client; deciding to log a request; deciding to limit bandwidth of a communication between a client and server. Of course, many other different actions may be supported.

Many readers will be familiar with the concept of visiting a "secure" Web site. That is, establishing communications between a personal computer (or other resource such as a mobile phone, personal digital assistant, etc.; for simplicity the term "client" shall be used to refer to such devices) and an Internet host (e.g., a server) using secure (or encrypted) communications. Usually, such communications are facilitated through a Web browser or other software application executing on the client. The secure nature of such communications are typically identified by a an icon (often in the form of a locked padlock) being displayed within the Web browser (or other user interface). The secure nature of the Web site may also be revealed or suggested by the use of the "https:" prefix in the Internet address for the host. This designates the use of a secure hypertext transport protocol, most commonly SSL.

Originally developed by Netscape Communications, Inc., the SSL protocol provides privacy between two communicating applications (i.e., the client's Web browser and the host's Web server). Before exchanging any confidential information via SSL, however, the host and (if desired) the client must provide proof to one another that these entities truly are the entities they purport to be: a process referred to as authentication. This too should be familiar to readers: when one seeks to cash a check or use a credit card, a merchant will often ask the buyer for some form of identification in order to verify that the buyer is who he or she purports to be.

In SSL communications, authentication is handled via a so-called handshake protocol, which allows the server and client to authenticate one another and to negotiate an encryption algorithm and cryptographic keys before the application protocol transmits or receives any data. These keys are later used to encrypt data to be exchanged between the client and the server. The complete details of such encryption methodologies are not critical to the nature of the present invention, however, portions of the handshake protocol are of interest.

FIG. 1 illustrates an example of an SSL handshake protocol between a client 100 and a server 102. The client begins by sending a client hello message 104 to which the server responds with a server hello message 106. The hello messages are used to establish various attributes for the ensuing communication session. Included in the server's hello message is a signed certificate 108 as well as a list of cipher specifications which may be used for the communications session and a session identifier. At this point the client and server have sufficient information to know whether or not a new master cryptographic key is needed for the session and, if so, the client will generate it and send same to the server. The master key is then used to generate individual session keys, which are used to encrypt/decrypt messages passed between the client (i.e., the application software executing at the client) and the server. The server will eventually provide the client with a verify message 110, which serves to authenticate the server inasmuch as a properly formatted verify message requires knowledge of the proper master key. Optionally, additional messages may be passed for the server to authenticate the client; and, ultimately the client and server will exchange messages to indicate that each entity's authentication of the other is finished. This ends the handshake and application layer data can now be exchanged.

As indicated above, during the SSL handshake the server will provide the client with its certificate. Certificates are digital documents issued by trusted parties and attest to the binding of a particular cryptographic key (known as a public key) to an individual or other entity. In other words, certificates provide assurances that computer entities are that which they purport to be, the assurances being backed by the "guarantee" of a trusted certificate issuer (much like merchants cashing checks or accepting credit cards rely on trusted authorities that issue drivers' licenses or other forms of identification). SSL certificates are based on X.509 certificates, an example of which (in abstract syntax notation) is illustrated in FIG. 2.

The digital certificate contains many fields of information. The Certificate Info field includes, 1) Version: This field identifies which version of the X.509 standard (i.e., ITU recommendation ITU-T X.509 and ISO/IEC/ITU 9594-8) applies to this certificate, which affects what information can be specified in it. Over the past few years various versions have been defined.
2) Serial Number: The entity that creates the certificate is responsible for assigning it a unique serial number.
3) Signature Algorithm Identifier: This identifies the algorithm used by the issuer (known as a certificate authority or CA) to sign the certificate.
4) Issuer Name: The name of the entity (usually a CA) that signed the certificate.
5) Validity Period: Each certificate is valid only for a limited amount of time, described by a start date and time and an end date and time.
6) Subject Name or Host Name: The name of the entity whose public key the certificate identifies.
7) Subject Public Key Information: This is the public key of the entity being named, together with an algorithm identifier which specifies which public key cryptographic system this key belongs to and any associated key parameters.

The present invention makes use of information in the Certificate Info field of the server's digital certificate to identify the host the client is contacting and, based on that identification, determine whether or not SSL communications may be passed encrypted through a firewall at a proxy. The passing of such encrypted communications is known in the art as tunneling. In some cases, for example, where the host is determined to be a trusted entity, SSL communications will be tunneled through the proxy/firewall, thereby ensuring privacy for the client/user. In other cases, SSL communications may be decrypted at the proxy/firewall so that they can be subjected to further scrutiny. As further discussed below, the present invention allows network managers to leverage URL databases used for categorizing servers or other internet hosts for use even with SSL communication sessions.

Figure 3:
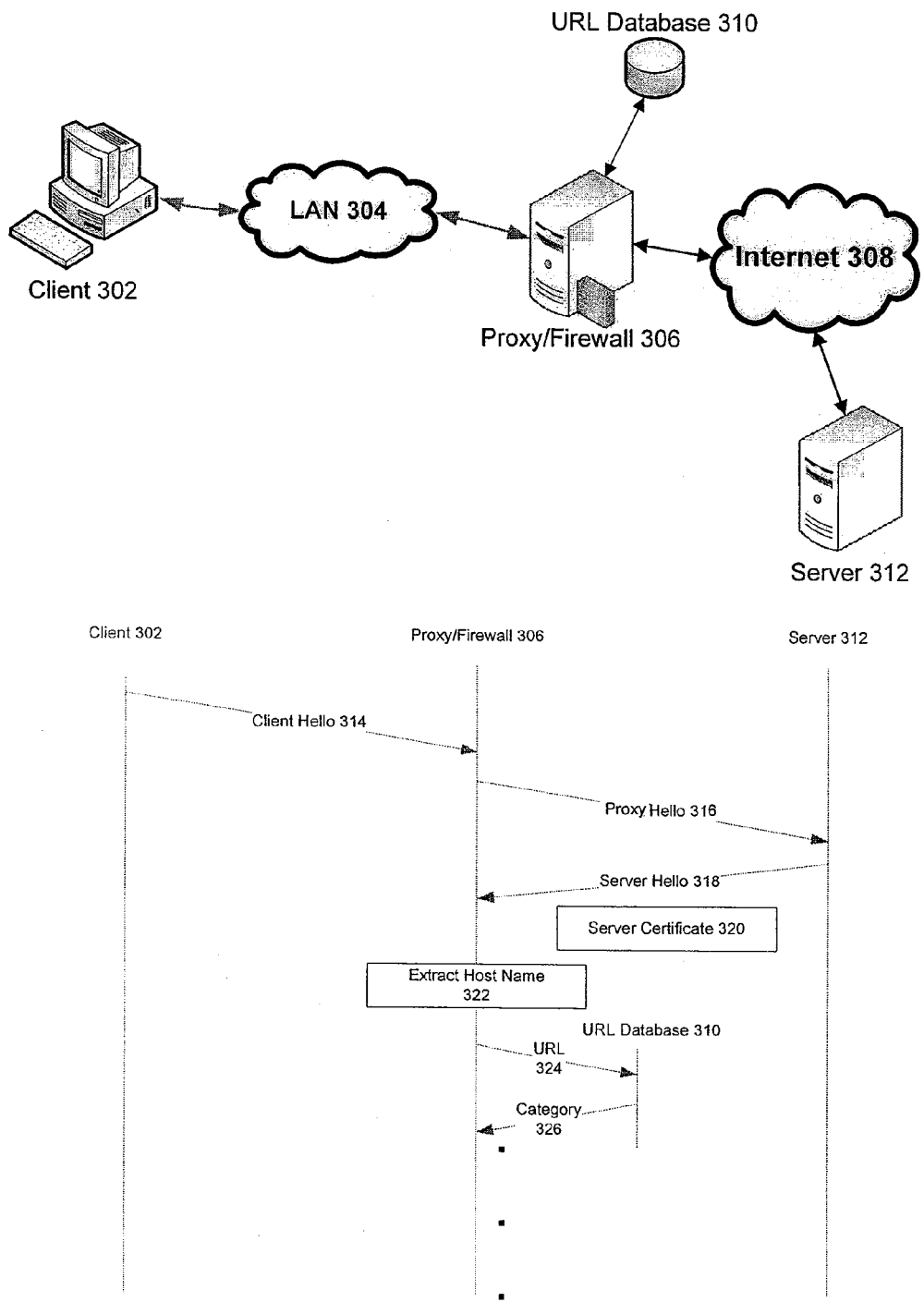
FIG. 3 illustrates the use of a proxy/firewall configured in accordance with an embodiment of the present invention to extract information from a digital certificate for use in making decisions regarding whether or not to permit a client to establish a secure communication session with an associated host.

FIG. 3 illustrates an example of the use of a proxy/firewall in accordance with embodiments of the present invention. Client 302 is a personal computer or other device, and may be communicatively coupled to a local area network 304, such as an enterprise network. The network 304 may be a wired and/or wireless network and client 302 may be a local client or a remote client. The precise configuration of the network 304 (and, indeed, its existence) is not critical to the present invention.

Situated between the client 302/network 304 and the Internet (or other network) 308 is a proxy/firewall 306. Proxy/firewall 306 may be a combined hardware/software system that implements policies that determine which traffic can pass between the two networks 304 and 308, blocking access from one to the other when one or more of these policies are implicated. An associated database 310 accessible by proxy/firewall 306 may include computer-readable instructions defining such policies. In one example, database 310 may include a table or other data structure populated with one or more URLs. The database 310 may be hosted at proxy/firewall 306 or it may be hosted remotely therefrom and accessible via one or more communication links and/or networks.

FIG. 4 illustrates an example of a table 400 populated with a number of URLs. These URLs may identify various Internet or other network hosts and may be full path addresses or merely the host names. The URLs may be segregated by categories within the table. That is, each URL may be associated with a category, defining attributes of the host and/or content associated with the URL. For example, categories might include news, business information, shopping, banking, political content, gambling, pornography, etc. Often, these URL tables are maintained by third party vendors and provided to users on a subscription basis. They are periodically updated to reflect the ever-changing nature of the Internet.

The function of the URL table is to allow network operators/administrators a mechanism by which they can police traffic to/from their network. For example, and referring again to FIG. 3, attempts by the client computer 302 to access a pornography Web site may be blocked at proxy/firewall 306 by consulting the URL database 310. The client's request will include the URL of the Internet host (e.g., www.hostname.com) 312, which can be used as an index (in whole or in part) to the URL database. The database may then provide an indication that the subject URL is categorized as being a pornography site. The proxy/firewall 306 uses this information in accordance with its policy-based rules to prohibit access to that site. As noted above, however, if the above-described request were made as part of an SSL session, then the URL of the host 312 could not be extracted from the client's request and, short of decrypting that request, the network administrator may be unable to prevent the undesired access to the pornography site.

To overcome this dilemma, the present invention makes use of the characteristics of the SSL handshake, and more particularly information contained in the server's digital certificate, to determine whether or not to permit communications between the client and the host. At the outset of the SSL communication, the client will transmit a hello message 314 as discussed above. This time, however, that hello message is received at the proxy/firewall 306. In response, the proxy/firewall 306 transmits its own hello message 316 to the same Internet protocol (IP) address as was identified in the client's initial request. That is, in addition to the SSL protocol hello attributes discussed above, the client's hello message 314 will include (as all internet messages do) a source IP address (identifying the entity making the request) and the destination IP address (indicating the entity to which the message is directed). The proxy/firewall 306 receives this destination IP address information and uses it to format and send its own hello message 316 to the server 312.

Note, this discussion assumes that the proxy's presence on the pathway to the Internet 308 is transparent to the client 302. That is, it is assumed that the client 302 is not making explicit requests to the proxy 306, in which case the proxy may be aware of the actual URL sought by the client even in an SSL transaction.

At this point, one may ask why the proxy/firewall 306 does not simply use the destination IP address included in the client's address to determine whether or not to allow the communication in much the same way as the URL database was used in the communication described above. In fact, such destination IP address filtering can be performed using a database of IP addresses in place of the URL database 310. However, trying to categorize Internet hosts of the basis of their IP addresses can be very unreliable. For example, IP addresses often change over time and IP address databases may therefore be frequently out of date. Moreover, a single IP address can potentially host multiple sites in multiple categories. Even reverse domain name system (DNS) lookups by which the IP address is resolved to a URL do not always provide accurate information regarding the host which is the subject of the client's request. Hence, although these methods can be used (and in fact are used in embodiments of the invention), the preference is for URL categorizations.

Returning to FIG. 3, the proxy hello message 316 is received at the server 312. From the server's point of view, the proxy hello message is indistinguishable from any other hello message. That is, the server 312 is not aware of the fact that the message is an attempt by the proxy/firewall to uncover the server's true identity to determine whether or not the client will be permitted contact with the server. Hence, the server 312 returns a hello message 318 that includes its certificate 320.

Upon receipt of the server's certificate 320, the proxy/firewall 306 extracts 322 the host name therefrom. This host name (or subject name) will be a URL, which can now be used to query 324 the URL database 310. The URL database will return category information 326 regarding the server's URL, which the proxy 306 can use to determine whether or not to permit the communication between client 302 and server 312 and/or whether or not to permit tunneled communications therebetween.

Thus, the present invention makes use of information extracted from an Internet host's digital certificate to perform URL filtering operations. SSL (or other) protocol handshakes are intercepted at a gateway and certificate requests are made to the intended host on behalf of the requesting client. When the host's certificate is returned in response to the request, the host name is extracted therefrom and used as an index to a URL database. The URL database returns information concerning one or more categories under which the host name was identified and that category information can then be used to determine whether or not and how to permit communications between the client and host. This last point is made so as to indicate there may be occasions (e.g., file downloads and the like) where the gateway will permit SSL communications but only if those communications are subject to decryption at the gateway. In some cases, the user at the client device may be asked to specifically consent to such decryption. Or, the decryption may occur without the user's knowledge in accordance with one or more existing network administrator policies. In other cases, e.g., where the host name has been identified as a reputable or trusted site (e.g., a banking site), the SSL communications may be tunneled through the gateway without being decrypted.

In addition to the use of the host name information, other information extracted from the server's digital certificate can be used in making such decisions. For example, the URL of the certificate's issuer is often included in the certificate. This information may be used by the proxy/firewall to categorize the issuer to see whether it is a recognized and/or trusted issuer. This can help prevent fraud, for example, where a host provider has attempted to counterfeit a certificate. Moreover, in some cases the present invention may verify the signature of the issuer as attached to the certificate. Although a determined counterfeiter may be able to replicate a legitimate issuer's URL it is highly unlikely that the counterfeiter could so replicate a valid signature. Thus, the proxy/firewall may be configured to validate the server's certificate through the use of the issuer's digital signature therein. In general then, the present invention provides for the use of any information in the server's certificate for use in deciding whether or not and how to permit communications between the client and the server.

In a related aspect, the present invention also encompasses the use of "referrer header information" in messages passed between clients and servers to determine whether or not to permit downloads of content or other information from Internet host identified in those referrer headers. That is, in addition to URL-based categorization the present invention can make use of header categorization to permit/deny communications between clients and servers.

To understand these aspects of the present invention, consider what happens when a client makes a request for a typical web page from a server. The Web page itself is not truly a "page" in the traditional sense. Instead, it is a sequence of computer-readable instructions which are read and interpreted by a Web browser running on a personal computer or other device. In response to these instructions, the browser formats and displays text and other items as instructed. For example, the Web page may be a set of instructions that tell a browser to display the word "STOP" in a particular font type and size.

In addition, the Web page instructions may include instructions to display a particular image (e.g., the image of a stop sign) at a particular location on the display of the client computer. Many times, however, the image itself will not be included in the instruction set that makes up the Web "page". Instead, it is very common for images to be stored elsewhere, even at a host separate from that storing the Web "page". Hence, rather than providing the browser with the actual image of the stop sign, the browser will receive instructions to request that image from a particular location identified by a particular URL.

Now, when the browser makes the request for the stop sign image, that request will be directed to the URL it received from the host of the Web page. Of course this URL could be subjected to the same kind of URL filtering as discussed above. In addition, however, because this URL identifying the location of the image now being requested came from a referral source (the original host at which the instructions constituting the Web page were obtained), the client's request will include information regarding that source of the referral. This is known as the referrer (or, technically, the referer [sic]) information and it is included in a so-called referer [sic] request-header field of the client's HTTP request for the image. Of course, it need not be an image that is requested, but instead can be any object.

The refer header field allows a client to specify, for the new server's benefit, the address (URL) of the resource from which the new URL of the requested object was obtained. The idea behind this mechanism was that the use of referrer information of this type would allow a server to generate lists of back-links to resources for interest, logging, optimized caching, etc. It also allows obsolete or mistyped links to be traced for maintenance. If the field value is a relative URI, it is interpreted relative to the original host's URL.

This refer header URL can also be categorized by the proxy/firewall in the manner described above, sometime permitting access to objects that otherwise might not be permitted. For example, suppose the user is visiting a news-oriented Web site and as part of a download of a page of that site the browser is instructed to make a request for an image hosted at a site which itself is categorized in a category to which the user would not ordinarily be permitted access under the firewall rules. In this case, the proxy/firewall will additionally categorize the refer header information and identify the request for the object as actually originating from the news-related site to which the user does have access. Thus, the firewall may be instructed to permit the download of the image from the site that would otherwise be blocked.

Alternatively, if categorization of a refer header URL indicated that a request to download an object originated from a host suspected of being a spyware or other malicious site, that request could be blocked by the firewall rules. Other uses for this refer header categorization technique include mechanisms to update URL databases. Of course, the refer header categorization techniques may be used in combination with the other URL filtering techniques described herein if so desired.

Thus, methods for extracting and categorizing URL information have been described. As discussed above, however, it is important to remember that the present invention is not limited to the embodiments described above. Instead, the invention should only be measured in terms of the following claims.

What is claimed is:

1. A method, comprising:
receiving, at a proxy, a client hello message from a client;
transmitting, from said proxy to an Internet host, a request for a digital certificate associated with the Internet host;
extracting, at the proxy, information from the digital certificate associated with the Internet host;
categorizing, at the proxy, said Internet host into one or more content categories according to said information extracted from the digital certificate, said categorizing including maintaining a table at said proxy wherein each Internet host is associated with a category which defines attributes of the Internet host or content associated with the Internet host; and
based on the one or more content categories into which the Internet host is categorized, determining, at the proxy, whether to (i) pass encrypted communication between a client and the Internet host through the proxy without decrypting the encrypted communication at the proxy or (ii) decrypt the encrypted communication between the client and the Internet host so as to permit examination of the encrypted communication at the proxy.

2. The method of claim 1, wherein the categorizing comprises using said information to index a data structure and retrieve a corresponding category for said Internet host from said data structure.

3. The method of claim 1, further comprising granting or denying access to said Internet host from the client according to access policies implemented at said proxy according to results of the categorizing.

4. The method of claim 3, wherein the granting of access comprises granting access via a secure communication session.

5. The method of claim 4, further comprising decrypting messages at said proxy during said secure communication session.

6. The method of claim 4, further comprising not decrypting messages at said proxy during said secure communication session.

7. The method of claim 4, wherein said secure communication session comprises a secure socket layer (SSL) communication session.

8. The method of claim 1, wherein said information comprises a host name.

9. The method of claim 1, wherein said information comprises a name of an issuer of said digital certificate.

10. A method, comprising:
receiving, at a proxy, a client hello message from a client;
transmitting, from said proxy to a referring source of a request for an object, a request for a digital certificate associated with the referring source;
categorizing, at the proxy, the referring source of the request for the object into one or more content categories, wherein the request for the object is made by the client to an Internet host and wherein the Internet host is referred to the client by the referring source; and
based on the one or more content categories into which the referring source is categorized, determining, at the proxy, whether to (i) pass encrypted communication between the client and the Internet host through the proxy without decrypting the encrypted communication at the proxy or (ii) decrypt the encrypted communication between the client and the Internet host so as to permit examination of the encrypted communication at the proxy.

11. The method of claim 10, wherein the categorizing comprises extracting identifying information for said referring source from the client's request at the proxy, and using said identifying information to retrieve category information describing said referring source from a data structure.

12. The method of claim 11, wherein the identifying information comprises a uniform resource locator (URL) of a resource associated with the referring source.

13. A method, comprising:
receiving, at a proxy, a client hello message from a client;
transmitting, from said proxy to a host computer system, a request for a digital certificate associated with the host;
categorizing, at the proxy, the host computer system into one or more content categories according to uniform resource locator (URL) information extracted from the digital certificate associated with said host, said categorizing including maintaining a table at said proxy wherein each Internet host is associated with a category which defines attributes of the Internet host or content associated with the Internet host; and
based on the one or more content categories into which the Internet host is categorized, determining, at the proxy, whether to (i) pass encrypted communication between a client and the Internet host through the proxy without decrypting the encrypted communication at the proxy or (ii) decrypt the encrypted communication between the client and the Internet host so as to permit examination of the encrypted communication at the proxy.

14. The method of claim 13, further comprising granting or denying a secure communication session with said host according to results of the categorizing.

15. The method of claim 14, further comprising tunneling messages which make up the secure communication session through the proxy without decrypting said messages so long as said secure communication session was authorized.

16. The method of claim 14, further comprising decrypting messages which make up the secure communication session at the proxy even though said secure communication session was authorized.

17. The method of claim 14, wherein the secure communication session comprises a secure socket layer (SSL) communication session.

* * * * *